Feb. 27, 1945.   I. M. HEMPHILL   2,370,164
ALKYLATION PROCESS
Filed June 17, 1941
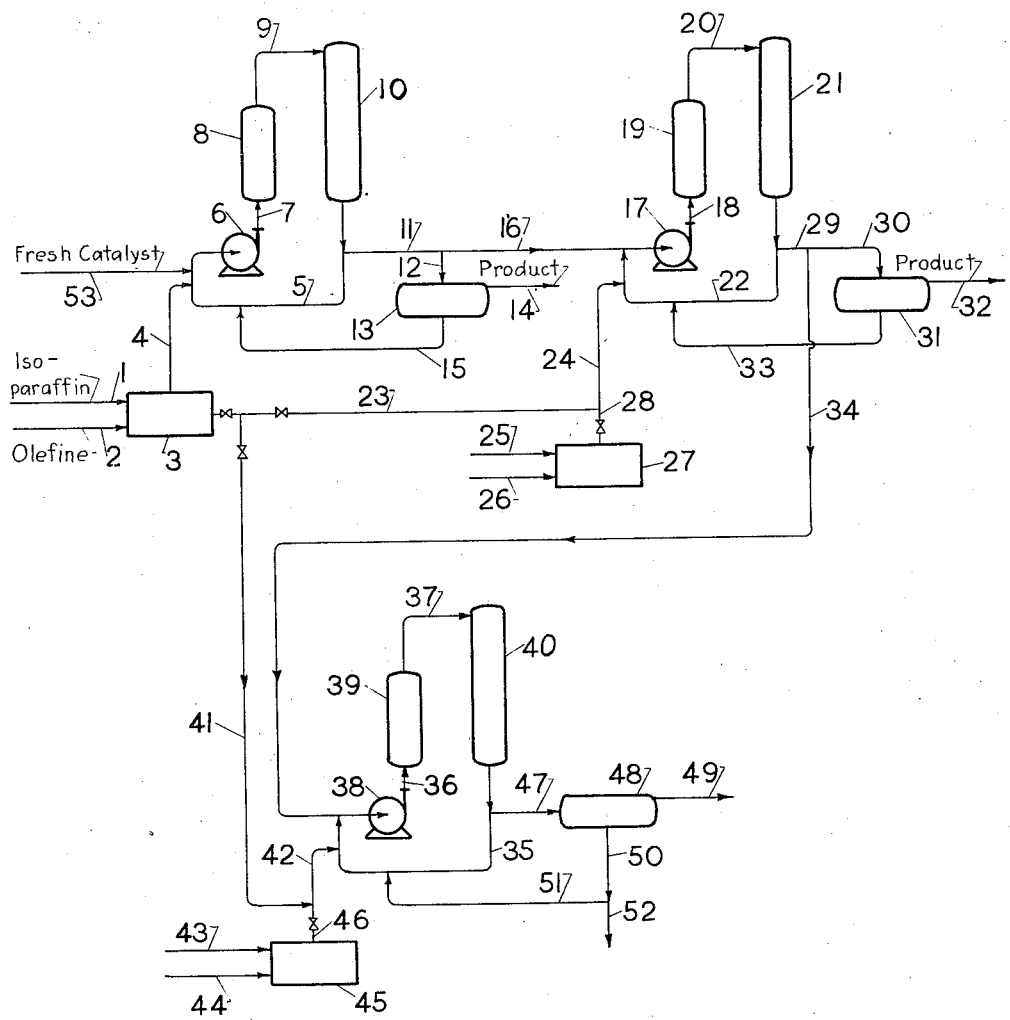
Inventor: Isaac M. Hemphill
By his Attorney Millard L. Caldwell Patented Feb. 27, 1945

2,370,164

UNITED STATES PATENT OFFICE 2,370,164

ALKYLATION PROCESS

Isaac M. Hemphill, Wilmington, Calif., assignor to Shell Development Company, San Francisco, Calif., a corporation of Delaware Application June 17, 1941, Serial No. 398,423

8 Claims. (Cl. 260—683.4)

This invention relates to the manufacture of higher boiling hydrocarbons by alkylation of isoparaffins and naphthenes having a tertiary carbon atom. It is directed to an improved multi-stage method of carrying out such reactions in the presence of alkylation catalysts in the liquid phase.

One object of the invention is to provide a more economical alkylation process which is easier to operate. Another object is the provision of an alkylation method in which more constant plant operating conditions may be maintained. A further object is to eliminate the loss of plant capacity heretofore involved in batch replacement of catalyst without sacrifice of catalyst life or product quality. It is also an object of the invention to provide a continuous method of operating a plurality of alkylation units with reduced supervision expense.

The alkylation of isoparaffins with olefines has been widely adopted by the petroleum industry for the production of superior motor fuels. Particularly advantageous methods of carrying out the reaction are described, for example, in United States patents, 2,211,747, 2,232,674 and 2,238,802. In all of these methods of operation the catalyst loses its activity during use and must be replaced by fresh or reactivated catalyst. This decrease in catalyst activity is associated with a decrease in the concentration of the catalyst and there are indications that the quality of the alkylate drops with the concentration of the catalyst. If the catalyst is continuously replaced, as by continuously feeding in fresh catalyst and withdrawing a corresponding volume of used catalyst from the system, the process must be carried out with catalyst which gives the poorest quality product in order to avoid excessive catalyst consumption. This undesirable condition has been avoided in the past by batch replacement of the catalyst. By this procedure the bulk of the product may be obtained with catalyst which has not dropped in concentration to a point where the decrease in product quality becomes noticeable. However, such batch replacement involves substantial loss of plant capacity during the periods in which the spent catalyst is being discharged and fresh catalyst is being pumped in. Furthermore, such periodic interruptions of the reaction upset the entire plant and require repeated readjustments to be made before uniform operating conditions can be reestablished. The present invention provides a method of operation whereby the advantages of both batch and continuous methods of catalyst replacement may be obtained without the disadvantages of either.

According to the invention, isoparaffins and naphthenes having a tertiary carbon atom are alkylated in a plurality of reaction stages, to each of which is fed the hydrocarbon to be alkylated and an alkylating agent. In each stage the reactants are emulsified with a liquid alkylation catalyst under suitable alkylation conditions, the most important of which is that a large excess of the hydrocarbon being alkylated is maintained relative to the alkylating agent used. From each reaction stage reacted emulsion is withdrawn to a separator in which product containing hydrocarbon is separated from the catalyst and removed from the system for recovery of the alkylate while separated acid is returned to the corresponding reaction stage. Fresh catalyst is fed to one reaction stage only, the catalyst for the succeeding stages being supplied in the form of emulsified reaction mixture from a previous reaction stage and spent catalyst is withdrawn from the last reaction stage. The attached drawing shows, diagrammatically, a preferred assemblage of apparatus for carrying out the process in three stages. The process is equally advantageous when two, four or more stages are used.

In the drawing, line 1 represents a supply line for the saturated tertiary carbon atom containing aliphatic hydrocarbon to be alkylated, for example, an isoparaffin such as isobutane or isopentane, and line 2 is the supply line for the olefine or the like to be used as alkylating agent. These reactants are blended in tank 3, preferably in proportions corresponding to a molecular excess of isoparaffin to olefine, advantageously 3 to 10 or more mols of saturated aliphatic tertiary hydrocarbon per mol of alkylating agent. It is feasible to omit blending tank 3 and feed the reactants directly to the reaction circuit, particularly when using alkylating agents which are less reactive than olefines, for example, alkyl halides. From tank 3 the reactants are fed at a uniform regulated rate by line 4 to line 5. In line 5 the feed is mixed with an emulsion of reacted hydrocarbon and catalyst which is continuously circulated by pump 6 through a closed circuit comprising line 7, cooler 8, line 9, time tank 10 and line 5. From the circulating stream of reaction mixture, emulsion is continuously withdrawn by line 11. A part of this withdrawn emulsion is conducted by line 12 to a separator 13 in which the mixture is allowed to stratify. The hydrocarbon layer containing alkylation products and excess isoparaffin is removed by line 14 while the separated catalyst is returned via line 15 to the reaction. The remainder of the withdrawn emulsion is conducted by line 16 to the second reaction unit, to which it is preferably fed to the suction side of circulating pump 17. This pump forms part of a closed circuit analogous to that of the first unit consisting of line 18, cooler 19, line 20, time tank 21 and return conduit 22. The reactants fed to this unit may be the same as those used in the first reaction unit, in which case they may be supplied, for example, via lines 23 and 24. Where one or both of the reactants used in the second unit are different from those employed in the first they may be supplied by lines 25 and 26 to tank 27 from which the blended mixture may be fed by lines 28 and 24 to the second reactor. Reacted emulsion is withdrawn from the circulating stream of reaction mixture by line 29. A part equivalent in hydrocarbon content to the feed to the second unit is conducted via line 30 to separator 31, from which product-containing hydrocarbon is removed by line 32 while separated catalyst is returned to the reaction circuit by line 33. The remaining emulsion which preferably is of an amount sufficient to supply the catalyst requirements of the third reaction unit is fed by line 34 to the circuit consisting of conduits 35, 36 and 37, circulating pump 38, cooler 39 and time tank 40. The hydrocarbon feed to this circuit may be introduced via lines 23, 41 and 42, if it is the same as that used in the first unit, or by lines 28, 23, 41 and 42, if it is the same as that used in the second unit but different from the feed to the first unit. Feed lines 43 and 44 to blending tank 45 may be used when the feeds to all of the units are different, the blended feed then being conducted to the reaction circuit by lines 46 and 42. From the third unit only so much emulsion is preferably withdrawn via line 47 as is required for recovery of the alkylation product of this unit. The so withdrawn emulsion is conducted to separator 48 from which the product-containing phase is removed by line 49 while acid phase is withdrawn by line 50. A part of the withdrawn catalyst is returned by line 51 to the third reaction unit while the remainder is removed from the system by line 52. The catalyst thus removed is replaced by fresh acid introduced into the first reaction unit by line 53.

By this new method of operation the plant may be run continuously under the same constant conditions. The operations are smoother at all stages. Even the distilling columns, not shown in the drawing, for recovering excess isoparaffin or alkyl naphthene to be recycled to the reaction from the hydrocarbon withdrawn through lines 14, 32 and 49, operate more uniformly as a result of the elimination of fluctuations resulting from irregular reactor operation. The yield and quality of the alkylation products are also more uniform because the reactors operate permanently under the same conditions. In addition the difficulties encountered due to freezing of the catalyst just after charging a fresh batch to the reactor when using 98% sulfuric acid, for example, are avoided since the acid in the units will always be of lower titratable acidity than the fresh acid. Furthermore, variation of the operating temperature in accordance with variations in the catalyst concentration is rendered unnecessary since each unit may be operated at a substantially constant catalyst concentration. In commercial scale operations of the process it has been found not only that the average of the entire product from all of the reactors is fully equal or superior to that obtained by prior methods of operation but also that surprisingly the quality of the alkylate from the last reactor in which catalyst of the lowest concentration is used is substantially the same as that of the alkylate from the first reactor in which a much higher catalyst concentration is maintained.

The process of the invention is of particular advantage in the alkylation of isoparaffins and alkyl naphthenes with olefines such, for example, as propylene, the butylenes, amylenes, cyclopentene, cyclohexene and higher olefines as, for instance, present in 70° C. end point cracked or reformed gasoline and the like. Instead of the olefines, themselves, polymers thereof or esters, either organic or inorganic, corresponding to such olefines or polymers may be used. Inorganic or organic esters of primary alcohols such as methyl, ethyl, propyl, butyl, isobutyl and like alcohols may be employed as alkylating agents instead of the secondary and tertiary esters corresponding to the olefines. The process is also advantageous when ethers or alcohols are used as the alkylating agent. It may likewise be used when aralkylating agents such as, for example, benzyl alcohol, cinnamyl alcohol, the monochloroethyl benzenes, and the like or other substituted alkylating agents, as 1-chloro-butene-3, acetyl chloride, mesityl oxide, etc., are employed, and the expression "alkylating agent" will therefore be understood as referring generically to any compound capable of substituting an alkyl group, which may or may not contain one or more substituent elements or groups, for a hydrogen atom attached to a tertiary aliphatic carbon atom.

The invention is not only of wide scope in regard to the alkylating agents which may be used, but also with respect to the tertiary aliphatic carbon atom-containing compounds which may be alkylated thereby and the alkylation acid catalysts which may be used. Thus, for example, instead of isobutane, isopentane, isohexane, 2, 2, 5-trimethyl hexane, methyl cyclopentane, methyl cyclohexane, ortho dimethyl cyclohexane and the like and suitable substitution products, as 1-chloro-4-methyl-pentane, etc., may be alkylated by the process of the invention. In place of sulfuric acid, halo-sulfonic acids or phosphoric acid or mixtures of sulfuric or phosphoric acids with boron fluoride and/or a hydrogen halide or organic complexes of aluminum chloride or mixtures of aluminum chloride with antimony chloride or the like such as are described in copending application, Serial No. 380,892, filed February 27, 1941, or other suitable agents may be used as the alkylation catalyst.

The particular reaction conditions which it will be most advantageous to maintain in each of the reaction stages will depend upon the particular isoparaffin or naphthene being alkylated and the alkylating agent and alkylation catalyst chosen.

By way of illustration, when alkylating isobutane with normal butylene using, for example, the unreacted hydrocarbons from the hot sulfuric acid polymerization treatment of a butane butylene fraction of cracking gases as the source of olefine, the following reaction conditions will give good results in an apparatus of the type shown in the drawing:

| | |
|---|---|
| Isoparaffin to olefine feed ratio | 3:1 to 12:1 |
| Isoparaffin concentration in the feed | 50% to 90% |
| Fresh H$_2$SO$_4$ catalyst concentration | 96% to 100% |
| Reaction temperature | 0° C. to 30° C. |
| Acid to hydrocarbon volume ratio in reactor | 0.6 to 1.5 |
| Volumes of recycled hydrocarbon per volume of feed | 15 to 100 |
| Olefine feed rate (volumes of liquid per volume of catalyst per hour) | 0.06 to 0.30 |
| Average residence time of hydrocarbon in reactor | 20 to 60 min. |
| Pressure | Sufficient to maintain the reactants substantially in the liquid phase |

It is not necessary, even when using the same reactants in all stages, to use the same conditions in each stage. As a general rule, it is advantageous when carrying out different alkylations in different reaction stages to feed the more readily alkylatable reactants to the later stage or stages of the system. Thus, for example, if isobutane and isopentane are to be separately reacted it is preferable to feed the latter to the last reaction stage. Similarly, where butylenes and amylenes are being used as alkylating agents it is advantageous to use the former in the early stage or stages and feed the amylenes to the later reaction stage or stages.

It is preferable to carry out the process so that the drop in catalyst concentration is approximately the same in each of the reaction stages. Thus, for example, in alkylating isobutane with secondary butylenes in the presence of sulfuric acid in three reaction stages, excellent results have been obtained by feeding fresh 98% acid to the first stage in which an acid concentration of about 95% is maintained, maintaining the acid concentration in the second stage at about 92% and discharging acid from the final stage at about 89% concentration. In this type of operation the plant capacity has been increased 12% and the octane number and yield of light alkylate as well as the acid life have been increased compared with similar operations carried out in the same plant using batch replacement of acid. As a general rule it is advantageous, when using sulfuric acid as the catalyst, to maintain an acid concentration of about 92% to 97% in one of the reaction stages while maintaining a lower concentration within the range of about 95% to 88% in a subsequent reaction stage by feeding thereto acid from the first said stage.

The transfer of emulsion from one stage to another has been emphasized as the preferred method of supplying catalyst to the reaction stages, other than the first stage, because such method of operation offers special advantages over other procedures. It is more economical and desirable to employ the preferred emulsion transfer method than other methods of operation. It will be seen that the invention offers advantages over countercurrent or concurrent multi-stage method of carrying out the alkylation of isoparaffins and the like. In particular, it avoids excessive contact of alkylate with catalyst such as may promote undesirable side reactions.

The invention is capable of considerable modification. For example, two or more reactors in parallel may be used in place of any one or more of the reaction stages through which the acid flows in series. Also, the catalyst supplied to the later reaction stages from an earlier stage or stages may be supplemented by fresh catalyst, although this procedure is generally less desirable because it adds to the difficulties of control. Still other changes may be made without departing from the invention.

I claim as my invention:

1. A process of alkylating a saturated aliphatic hydrocarbon having a tertiary carbon atom by reaction with an alkylating agent in the presence of an alkylation catalyst in the liquid phase in a plurality of reaction stages through which said catalyst passes in series, fresh catalyst being supplied only to the first of said reaction stages while spent catalyst is withdrawn only from the last of said stages, which comprises feeding the fresh saturated aliphatic hydrocarbon having a tertiary carbon atom which is to be alkylated and fresh alkylating agent to each of said reaction stages, intimately contacting said reactants therein with the alkylation catalyst under alkylating conditions to form a reacted emulsion, withdrawing reacted emulsion from each reaction stage, separating a part of said withdrawn emulsion to recover product-containing hydrocarbon from catalyst which is returned to the same reaction stage and feeding another part of said withdrawn emulsion from each reaction stage, except the last, to the next succeeding reaction stage of the series to supply catalyst thereto.

2. A process of alkylating a saturated aliphatic hydrocarbon having a tertiary carbon atom by reaction with an olefin in the presence of an alkylation catalyst in the liquid phase in at least two reaction stages through which said catalyst passes in series, fresh catalyst being supplied only to the first of said reaction stages while spent catalyst is withdrawn only from the last of said stages, which comprises feeding the fresh saturated aliphatic hydrocarbon having a tertiary carbon atom which is to be alkylated and said olefin to each of said reaction stages, intimately mixing said reactants therein under alkylating conditions to form a reacted emulsion, withdrawing said reacted emulsion, separating a part of said withdrawn emulsion to recover product-containing hydrocarbon therefrom, feeding another part of said withdrawn emulsion from each reaction stage, except the last, in sufficient amount to the next succeeding reaction stage of the series to maintain a substantially constant ratio of catalyst to hydrocarbon therein.

3. A process of alkylating an isoparaffin by reaction with an alkylating agent in the presence of an alkylation catalyst in the liquid phase, in a plurality of reaction stages through which said catalyst passes in series, fresh catalyst being supplied only to the first of said reaction stages while used catalyst removed from the system is taken only from the last of said stages, which comprises feeding fresh isoparaffin and fresh alkylating agent to each of said reaction stages, intimately contacting said reactants therein with the alkylation catalyst under alkylating conditions to form a reacted emulsion, withdrawing reacted emulsion from each reaction stage, separating a part of said withdrawn emulsion to recover product-containing hydrocarbon from catalyst and feeding another part of said unseparated withdrawn emulsion from each reaction stage, except the last, to the next succeeding reaction stage of the series to supply catalyst thereto.

4. A process of alkylating an isoparaffin by reaction with an olefin in the presence of an acid alkylation catalyst in the liquid phase in a plurality of reaction stages through which said catalyst passes in series, fresh catalyst acid being supplied only to the first of said reaction stages while used catalyst is withdrawn from the system from the last of said stages, which comprises feeding fresh isoparaffin and olefin to each of said reaction stages, continuously withdrawing reacted emulsion from each reaction stage, feeding a major portion of the withdrawn emulsion to a separator in which product-containing hydrocarbon is separated from catalyst acid and feeding the remaining minor portion of unseparated emulsion from each reaction stage, except the last, to the next succeeding reaction stage of the series.

5. A process of alkylating isobutane by reaction with a normally gaseous olefin of at least three carbon atoms per molecule in the presence of concentrated sulfuric acid in a plurality of reaction stages through which the sulfuric acid passes in series, fresh sulfuric acid being supplied only to the first of said reaction stages while used sulfuric acid catalyst phase is removed from the system only as catalyst withdrawn from the last of said reaction stages, which comprises feeding fresh isobutane and olefin to each of said reaction stages, continuously withdrawing reacted emulsion from each reaction stage, feeding a portion of the withdrawn emulsion to a separator in which product-containing hydrocarbon is separated from sulfuric acid catalyst and passing another portion of the unseparated withdrawn emulsion from each reaction stage, except the last, to the next succeeding reaction stage of the series.

6. A process of alkylating isobutane by reaction with a normally liquid olefin in the presence of concentrated sulfuric acid in a plurality of reactors through which the sulfuric acid passes in series, fresh sulfuric acid being supplied only to the first of said reactors while used catalyst phase is removed from the system only as catalyst withdrawn from the last of said reactors, which comprises separately feeding fresh isobutane and said olefin to each of said reactors, maintaining an acid concentration of about 92% to 97% in the first of said reactors by feeding fresh sulfuric acid of higher concentration thereto, maintaining a lower acid concentration within the range of about 88% to 95% in the next succeeding reactor by feeding thereto a part of the reacted emulsion withdrawn from the first said reactor prior to any separation thereof and separately separating reacted emuslion from each of said reactors for recovery of isobutane alkylation product therefrom.

7. In a process of alkylating isobutane by reaction with a normally gaseous olefin in the presence of concentrated sulfuric acid, the steps of agitating isobutane, said olefin and sulfuric acid under alkylating conditions, withdrawing a part of the resulting emulsion, separating a portion of the withdrawn emulsion into a hydrocarbon phase and an acid phase, removing the separated hydrocarbon phase from the system, returning the separated acid to said reaction and feeding the remainder of said withdrawn emulsion to a second reaction zone in which it is contacted with isobutane and olefin free from alkylation products.

8. In a process of alkylating an isoparaffin by reaction with an olefin in the presence of an acid alkyation catalyst, the steps of agitating said isoparaffin, olefin and acid alkylation catalyst under alkylating conditions, withdrawing a part of the resulting emulsion, separating a portion of the withdrawn emulsion into a hydrocarbon phase and alkylation catalyst phase, removing the separated hydrocarbon phase from the system, returning the separated alkylation catalyst to said reaction and feeding the remainder of said withdrawn emulsion to a second reaction zone in which it is contacted with isoparaffin and olefin free from alkylation products.

ISAAC M. HEMPHILL.